July 21, 1964   J. P. McATEE   3,142,005
LOCKING RELAY FOR GAUGES AND THE LIKE
Filed Jan. 26, 1961   2 Sheets-Sheet 2

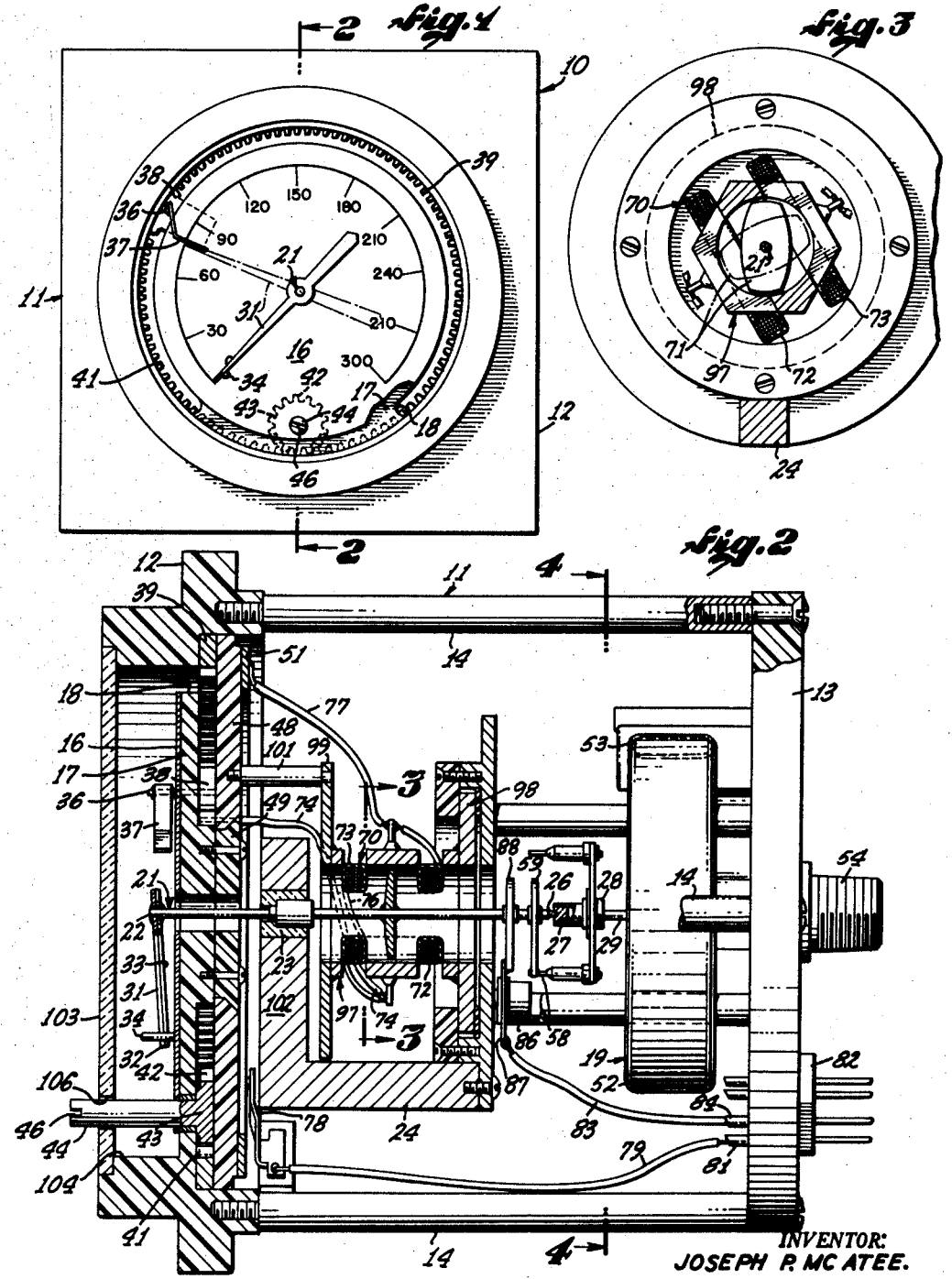

INVENTOR:
JOSEPH P. MC ATEE.
BY
PATENT AGENT.

United States Patent Office 3,142,005
Patented July 21, 1964

3,142,005
LOCKING RELAY FOR GAUGES AND THE LIKE
Joseph P. McAtee, 11611 Sepulveda, San Fernando, Calif.
Filed Jan. 26, 1961, Ser. No. 85,146
7 Claims. (Cl. 317—154)

This invention relates to a locking relay for gauges and the like and more particularly to an adjustable means for locking the pointer of a gauge at a predetermined point whereby an electrical circuit is closed for energizing an alarm, limiting or control function.

This invention provides a new and improved locking relay for gauges and the like, which provides electromagnetic locking coils juxtaposed to an armature, in the form of a permanent magnet, secured to a pointer shaft for rotating the shaft in response to energizing of the coils. The coils are energized in response to contact of the pointer with a movable contact means movably mounted adjacent to a dial of the gauge, the pointer shaft, pointer, adjustable contact means and the locking coils being electrically connected in a low-resistance series circuit having a source of electrical energy and a load. The adjustable contact means is set to be engaged by the pointer at a given rotation of the pointer shaft to close the series circuit and energize the locking coils which, in turn, effects the permanent magnet to bias the pointer firmly against the movable contact.

The pointer shaft is rotatably mounted between two electrically insulated bearings of the gauge and is rotated by a pressure-responsive device, or other, to rotate the pointer.

In this manner, the pointer has a dual purpose, one being to indicate the rotation of the shaft, that is, the pressure or amount of electrical energy required to rotate the pointer to contact the adjustable contact means, the other being to act as a switch arm to close a circuit energizing a discrete relay for actuating an alarm, limiting or control means.

It is among the objects of this invention to provide a new and improved means for translating a pressure or electrical value into a rotation of a pointer for indicating the value and for actuating an alarm, limiting or control device remote therefrom.

Another object of this invention is to provide a new and improved locking relay for gauges and the like in which a pointer thereof acts to indicate given values on a dial and to close an electrical circuit for actuating another device.

A further object of this invention is to provide a new and improved device in which an improved electrical contact is made between the pointer and an adjustable contact means which may be preset for establishing a predetermined timing of actuation.

Still another object of this invention is to provide a new and improved locking relay for gauges and the like in which a new and improved locking relay is energized to hold the pointer in engagement with the movable contact means to make a low resistance circuit and to lock the pointer to the adjustable contact until the circuit is interrupted by a manually or automatically operated switch.

Another object of this invention is to provide a new and improved locking relay for gauges and the like which is economical to manufacture and capable of mass production.

A general object of this invention is to provide a new and improved locking relay for gauges and the like, of the character described, which overcomes disadvantages of prior means and methods heretofore intended to accomplish similar purposes.

These and other objects of this invention will be more apparent from the following detailed description, drawings and appended claims.

In the drawings:

FIGURE 1 is a front side view, in elevation, of the device of this invention;

FIGURE 2 is a vertical cross-sectional view as taken substantially along the line 2—2 of FIGURE 1 with parts thereof shown in elevation;

FIGURE 3 is a vertical cross-sectional view as taken substantially along the line 3—3 of FIGURE 2;

Figure 4:
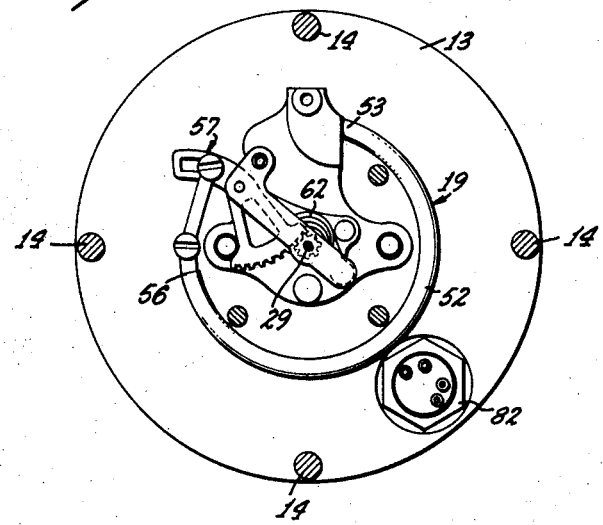
FIGURE 4 is a vertical cross-sectional view as taken substantially along the line 4—4 of FIGURE 2.

Referring in detail to the drawings, there is shown by way of illustration, but not of limitation, a gauge designed and constructed in accordance with this invention and generally referred to by the numeral 10. The gauge 10 may be of any suitable configuration and is exemplified herein as having a frame 11 comprising a front wall 12, a rear wall 13 secured together in spaced relationship as by a plurality of posts 14. A calibrated dial 16 is rigidly secured to or formed integrally with a web 17 of the front panel 12. An arcuate slot 18 is formed around the dial 16, the dial being calibrated in any suitable manner corresponding to the movement and sensitivity of an actuator means generally designated by the numeral 19 and mounted on the inner surface of the rear wall 13 for a purpose to be hereinafter described.

A pointer shaft 21 of electrical conducting material is rotatably supported within the frame, in electrically insulated relationship thereto. The shaft 21 is supported adjacent to one of its ends 22 in a ceramic or jeweled bearing 23 of a stationary bracket 24 and at its other end 26 in a jeweled or other non-electric conductive bearing 27 of a coupling 28 secured to an end of a shaft 29 actuated by the actuator means 19 in a manner to be hereinafter described. A pointer 31, of electrical conductive material, is secured to the end 22 of the shaft 21 for rotation with the shaft and includes an outer tip end 32 overlying the calibrations of the dial for indicating pressure, electrical, or other values indicated by the rotation of the shaft 21 when actuated by the actuator means 19. If a pointer having a non-conducting material is used, an additional strip or liner 33 of electrical conducting material is preferably secured thereto by sweating, soldering, or the like.

A first stop member, in the form of a pin 34, extends outwardly of the dial 16 to register the pointer 31 in the normal zero position. A second stop means, in the form of an adjustable stop pin 36, is movably mounted relative to the dail 16 and includes a contact member 37 selectively engageable by the pointer 31 in response to rotation of the shaft 21, as will be hereinafter described.

The pin 36 extends outwardly of a lug 38 secured to or formed integrally with a ring gear 39 rotatably mounted on the frame and circumjacent to the dial 16. The ring gear 39 includes gear teeth 41 meshed with the gear teeth 42 of a spur gear 43 rotatably mounted on the web 17. The gear 43 includes a forwardly extending shank portion 44 having a kerfed end 46 whereby the gear 43 may be selectively rotated by engagement by a screwdriver, or the like, in the kerf 46 to rotate the ring gear 39. When the ring gear 39 is rotated, the contact member 37 is moved along the periphery of the dial 16 to preset the contact member at a predetermined angular relation to the pointer 31.

As best seen in FIGURE 2, a ring 48 of dielectric material is rotatably mounted, as on a hub 49 secured to the web 17, and cemented or otherwise secured to the ring gear 39 for movement therewith. A slip ring 51 is cemented or otherwise secured to the ring 48 for rotation therewith, the ring 51 being formed of an electrical conducting material.

As best seen in FIGURES 2 and 4, the actuator means 19 is herein illustrated as a Bourdon tube 52 having one end 53 communicating with an outlet 54 adapted to be connected to a pressurized system and its opposite end 56 secured to linkage 57 for translating expansion of the tube 52 into a rotation of a shaft 29 in conventional manner. It is to be understood, however, that the actuator means 19 is shown for illustrative purposes only and that other means such as a bellows assembly or diaphragm may be employed with the pressurized system to rotate the shaft 29 in response to pressure changes. Likewise, the shaft 29 may be rotated by an electronic system employing a moving coil, not shown, or any other actuating medium reaction to rotate the shaft 29.

Secured to the shaft 29, for rotation therewith, is an insulated terminal 58 soldered, welded, or otherwise secured to one end of a hair spring 59, the other end 61 of the spring 59 being secured to the shaft 21. Rotation of the shaft 29 is transmitted through the terminal 58 to the hair spring 59 to rotate the shaft 21 in response to pressure changes within the Bourdon tube 52 and the pressurized system. Rotation of the shaft 21 rotates the pointer 31 to indicate the pressure (or electrical values) on the dial 16. A hair spring 62 acts as a return spring to return the shaft 29 when the Bourdon tube 52 is relieved of pressure whereas the hair spring 59 acts to bias the shaft 21 and the pointer 31 to return in response to relieving of tension by the rotational force of the shaft 29.

Figure 5:
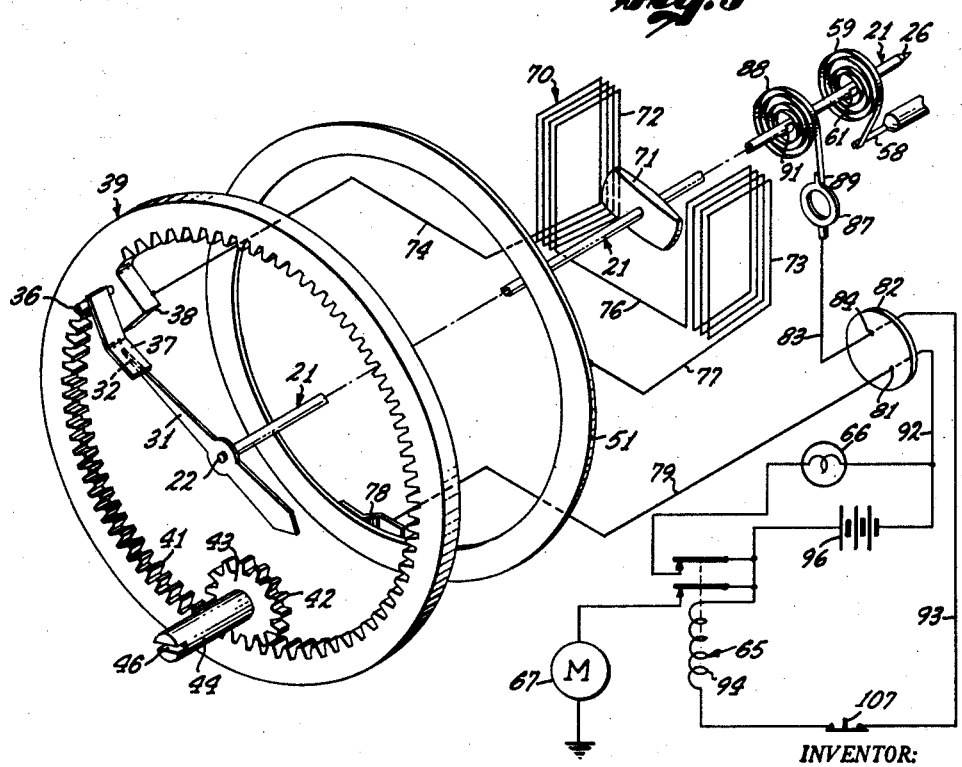
FIGURE 5 is a fragmentary, diagrammatic view of the operative parts of this invention, illustrated in exploded relationship.

When the shaft 21 is rotated sufficiently to bring the pointer 31 into engagement with the contact 36, 37, a series circuit is energized to energize any desired control, limiting, or other devices desired. For example, a relay, generally designated by the numeral 65 and best seen in FIGURE 5, is energized by the contact of the pointer to the movable contact so as to actuate several devices, such as a warning signal 66, or a motor 67.

In order that an unwavering and positive electrical contact is established between the pointer and the movable contact member 36–37, the pointer 31 is preferably locked in contact therewith when the pointer 31 reaches the movable contact member. For this purpose, a locking relay generally designated by the numeral 70 is employed to lock the pointer 31 in contact with the contact member 37. The locking relay 70 comprises an armature 71, preferably of a permanent Alnico magnet fixed on the shaft 21 intermediate of the pointer 31 and the end 26 and having its poles magnetically biased by a pair of diametrically opposed coils 72 and 73 at the instant of contact of the pointer 31 with the contact member 37. The coils 72 and 73 are wound in series with the contact 37, the pointer 31, and the shaft 21. A conductor 74 connects one end of one of the coils, such as the coil 72, to the inwardly extending lug of the ring gear 39 whereas the other end of the coil 72 is connected by electrical conductor 76 to one end of the other coil 73. The other end of the coil 73 is electrically connected by a conductor 77 to the slip ring 51. A brush 78, preferably of electrical conducting spring material, is mounted on the frame for contact with the slip ring 51 and is electrically connected by an electrical conductor 79 to one post 81 of the terminal connector 82 mounted on the frame. An electrical conductor 83 connects another terminal post 84 of the terminal connector 82 to a terminal post 86 having an insulated terminal 87 secured thereto.

Electricity is conducted from the terminal 87 to the shaft 21 in any suitable means allowing the shaft 21 to rotate. For example, a hair spring 88, best seen in FIGURES 2 and 5, has one end 89 connected to the terminal 87 and another end 91 secured to the shaft 21 whereby the shaft may be rotated and still retain constant electrical contact between the shaft 21 and the terminal 87. Optionally, a brush arrangement (not shown) may be used, if desired.

It will now be more clearly seen from the foregoing description, that when the shaft 29 is rotated in response to pressure changes of the actuator means 19 or electrical circuitry changes in response to an electrical actuator, rotation is transmitted to the shaft 21 through the terminal 58-hair spring 59 connection. The rotation of the shaft 21 rotates the pointer 31 and, if sufficient, engages the pointer end 32 with the contact member 36–37. In response to the engagement thereof, the circuit is closed, including the conductor 83, terminal 87, hair spring 88, shaft 21, pointer 31, contact member 36–37, ring gear 39, conductor 74, coil 72, conductor 76, coil 73, conductor 77, slip ring 51, brush 78, and conductor 79. The conductors 83 and 79 are connected in series as by conductors 92 and 93, respectively, through the terminal coupling 82 to energize the coil 94 of the relay 65 through a source of electrical energy such as the battery indicated by the numeral 96.

In response to closing of the circuit, the coils 72 and 73 are energized to effect a magnetic flux effecting the armature 71 to rotate in a direction to bias the pointer against the contact member 37, forming a firm and positive contact therebetween.

In order that the coils 72 and 73 are accurately positioned when energized to drive the armature 71 in the correct rotational direction to rotate the shaft 21, the armature is constantly positioned a given number degrees ahead of the poles of the flux of the coils. For this purpose, the coils are mounted on a rotatable core 97 of non-magnetic material. The core 97 includes a flange 98 rotatably mounted relative to the frame 24 and an opposing flange 99 secured to the ring 48 as by a post 101 so that when the ring 48 is rotated, in response to rotation of the ring gear 39, the core 97 is rotated to position the coils 72 and 73 in a correct relative position to the armature 71. The bracket 24 preferably includes an upstanding arm 102 in which the bearing 23 of ceramic material supporting the shaft 21 is disposed. A transparent window 103 is preferably provided in covering an open end 104 of the wall 12 to protect the pointer 31 and contact 37 from injury. An aperture 106 may be provided in the window for the shank 44 to extend through for access for rotation of the gear 43. The window 103 is omitted in FIGURE 1 for greater clarity.

In this manner, a low resistance circuit may be used to overcome the force of the spring 59 and holds the pointer against the adjustable contact to control or actuate any given device externally located relative to the gauge. A switch, in the form of a manual or automatic device and designated by the numeral 107, is preferably located as in the conductor 93, whereby the circuit may be automatically or manually interrupted. The device 107 may be manually or automatically actuated to interrupt the circuit to release the pointer from the contact 37, if desired, or to test the circuit to see whether the pressure or electrical value is still sufficient to rotate the shaft 21 and pointer 31 at the desired evaluation.

While the instant invention has been shown and described herein in what is conceived to be the most practical and preferred embodiments, it is recognized that departures may be made therefrom within the scope of the invention, which is therefore not to be limited to the details disclosed herein, but is to be afforded the full scope of the claims.

What is claimed as new and desired to secure by Letters Patent is:

1. An electric device for indicating and controlling a pressure condition in a pressurized system, and the like, comprising: pressure responsive means adapted to be connected to the pressurized system for actuation of said pressure responsive means in response to changes of the pressure condition in the pressurized system, a member operatively connected to the pressure responsive means so as to be rotated in response to actuation thereof; a pointer shaft of electrical conductive material mounted for rotation about its longitudinal axis, a pointer secured to said pointer shaft for rotation therewith and defining a first contact; means connecting said shaft to said rotatable member for rotation therewith and in electrically insulating relationship thereto; second electrical contact means adjustably mounted for circumferential movement around the axis of said shaft and engageable by said pointer in response to predetermined rotation of said shaft, holding means holding said second electrical contact means stationary when it is contacting said first contact, and adjusting means for overcoming said holding means and rotating said second electrical contact means about said shaft to a predetermined set position, locking relay means for biasing said contacts together when closed, said locking relay means including armature means fixed to said shaft so as to be rotatable therewith, and coil means secured to said second movable contact means so as to be rotatable therewith, said coil means being electrically connected in series with said first and second contacts and energized in response to closing of said first and second contacts so as to create a magnetic flux effective to rotate said armature in a direction to bias said pointer into engagement with said second contact means regardless of the angular position of said second contact means relative to said shaft.

2. A device as defined in claim 1 including a torsion spring resiliently connecting said member to said shaft so said member may rotate in either direction while said contacts are engaged.

3. A device as defined in claim 1 wherein said holding and adjusting means include a frame enclosing said pointer and rotatably supporting said member and shaft, a ring gear journalled in said frame coaxial with said shaft, a spur gear rotatably mounted on said frame and engaging said ring gear, said second contact secured on said ring gear, means for rotating said spur gear so as to rotate said ring gear and change the angular position of said second contact relative to said first contact.

4. A device as defined in claim 3, including a dial face with indicia means thereon supported on said frame adjacent said pointer.

5. A device as defined in claim 3, wherein said pressure responsive means comprises a Bourdon tube, said Bourdon tube connected to said member in such a manner so as to force said pointer into engagement with said second contact only upon an increase in pressure in said system.

6. A device as defined in claim 3, wherein said ring gear is composed of insulating material and has an annular exterior surface journalled within an annular groove in said frame, an annular row of teeth formed on the interior of said ring gear mating with teeth on said spur gear, an annular electrically conductive ring secured to said ring gear and electrically connected to said second contact, conductor means connecting said conductor ring to said coils and brush means mounted on said frame for connecting said ring to a source of electricity.

7. An electric device for indicating and controlling a pressure condition in a pressurized system, and the like, comprising: pressure responsive means adapted to be connected to the pressurized system for actuation of said pressure responsive means in response to changes of the pressure condition in the pressurized system, a member operatively connected to the pressure responsive means so as to be rotated in response to actuation thereof; a pointer shaft of electrical conductive material mounted for rotation abouts its longitudinal axis, a pointer secured to said pointer shaft for rotation therewith and defining a first contact; means connecting said shaft to said rotatable member for rotation therewith and in electrically insulated relationship thereto; second electrical contact means adjustably mounted for circumferential movement around the axis of said shaft and engageable by said pointer in response to predetermined rotation of said shaft, holding means holding said second electrical contact means stationary when it is contacting said first contact, and adjusting means for overcoming said holding means and rotating said second electrical contact means about said shaft to a predetermined set position, locking relay means for biasing said contacts together when closed, said locking relay means including an armature assembly and a coil assembly, one of said assemblies fixed to said shaft so as to be rotatable therewith and the other of said assemblies secured to said second movable contact means so as to be rotatable therewith, said coil means being electrically connected in series with said first and second contacts and energized in response to closing of said first and second contacts so as to create a magnetic flux effective to urge said armature in a direction to bias said pointer into engagement with said second contact means regardless of the angular posiiton of said second contact means relative to said shaft.

References Cited in the file of this patent

UNITED STATES PATENTS

| | | |
|---|---|---|
| 816,112 | Mershon | Mar. 27, 1906 |
| 1,442,309 | Thompson | Jan. 16, 1923 |
| 1,737,973 | Lovejoy | Dec. 3, 1929 |
| 2,499,451 | Blomberg | Mar. 7, 1950 |
| 2,528,336 | Bristol | Oct. 31, 1950 |
| 2,780,709 | Thompson | Feb. 5, 1957 |
| 2,920,155 | Corcoran | Jan. 5, 1960 |
| 2,992,301 | Fisher | July 11, 1961 |